(12) United States Patent
Gordon et al.

(10) Patent No.: US 9,985,930 B2
(45) Date of Patent: May 29, 2018

(54) REVERSE PROXY FOR ACCESSING LOCAL NETWORK OVER THE INTERNET

(71) Applicant: Wanpath, LLC, San Francisco, CA (US)

(72) Inventors: Daniel J. Gordon, Berkeley, CA (US); Robert E. Schenk, Oakland, CA (US)

(73) Assignee: Wanpath, LLC, San Francisco, CA (US)

( * ) Notice: Subject to any disclaimer, the term of this patent is extended or adjusted under 35 U.S.C. 154(b) by 0 days. days.

(21) Appl. No.: 15/698,457

(22) Filed: Sep. 7, 2017

(65) Prior Publication Data

US 2018/0077121 A1    Mar. 15, 2018

Related U.S. Application Data

(60) Provisional application No. 62/394,385, filed on Sep. 14, 2016.

(51) Int. Cl.
*H04L 29/06* (2006.01)
*H04L 29/12* (2006.01)
*H04L 29/08* (2006.01)

(52) U.S. Cl.
CPC ...... *H04L 63/0281* (2013.01); *H04L 61/1511* (2013.01); *H04L 67/42* (2013.01); *H04L 67/02* (2013.01); *H04L 67/2895* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 2002/0184327 A1* | 12/2002 | Major | H04L 29/06 709/213 |
| 2004/0193695 A1 | 9/2004 | Salo et al. | |
| 2007/0011733 A1 | 1/2007 | Gbadegesin et al. | |
| 2007/0234418 A1 | 10/2007 | Song et al. | |
| 2010/0071052 A1* | 3/2010 | Mao | H04L 63/0823 726/12 |
| 2011/0276718 A1* | 11/2011 | Steiner | H04L 45/124 709/241 |
| 2012/0239790 A1 | 9/2012 | Doane et al. | |
| 2013/0205025 A1 | 8/2013 | Shamsee et al. | |
| 2014/0380461 A1 | 12/2014 | Doane et al. | |
| 2016/0087933 A1* | 3/2016 | Johnson | G06F 8/60 709/245 |
| 2016/0087942 A1 | 3/2016 | Yaguchi et al. | |
| 2016/0189067 A1* | 6/2016 | Law | G06Q 10/06 705/34 |
| 2016/0285831 A1 | 9/2016 | Doane et al. | |
| 2017/0230335 A1 | 8/2017 | Walker | |
| 2017/0272316 A1* | 9/2017 | Johnson | G06Q 10/103 |

\* cited by examiner

*Primary Examiner* — Kaveh Abrishamkar
(74) *Attorney, Agent, or Firm* — Kilpatrick Townsend & Stockton LLP (57) ABSTRACT

Embodiments of the present invention provide a reverse proxy mechanism for securely exposing, displaying and interacting with electronic content associated with a local network though a redundant service bus to the internet over secure socket layer (SSL).

8 Claims, 4 Drawing Sheets

REVERSE PROXY FOR ACCESSING LOCAL NETWORK OVER THE INTERNET

CROSS-REFERENCES TO RELATED APPLICATIONS

This application is a nonprovisional patent application of Ser. No. 62/394,385 entitled "Reverse Proxy for Accessing Local Network Over the Internet," filed Sep. 14, 2016, the disclosure of which is hereby incorporated in its entirety.

BACKGROUND OF THE INVENTION

The present invention relates to remote access of a proprietary local network over the Internet. Common techniques for this are complex. A typical technique uses a virtual private network (VPN) remote access solution. A VPN server may be placed behind a firewall, which requires firewall changes. Typically, the firewall must be configured with input and output filters on its Internet and perimeter network interfaces to allow tunnel maintenance traffic and tunneled data to pass through the firewall to the VPN server. Other filters can allow traffic to Web servers and other types of servers to pass through the firewall. A VPN also needs local SSL certificates, which need to be configured, and local hostnames or Network Translation policies. It is desirable to have a less complex method for remote access.

BRIEF SUMMARY OF THE INVENTION

Embodiments of the present invention provide a reverse proxy mechanism for securely exposing, displaying and interacting with electronic content associated with a local network though a redundant service bus to the internet over secure socket layer (SSL).

In one embodiment, a client web server agent on the remote private server network assigns a static port and operates in listen mode. No firewall adjustment is needed, since only outbound communication is used after listening for a request from an internet client, with inbound communication being in response to the initial outbound communication. The reverse proxy does the translation from default port 443 to the static port assigned by the client web server agent. This translation allows a relative path to be used.

Embodiments thus provide a secure mechanism for exposing internal network ports through a redundant pathway over Secure Socket Layer (SSL) without requiring firewall changes, local SSL certificates, local hostnames or Network Translation policies. The reverse proxy mechanism provides redundant pathways for remote clients and local servers to interact over SSL by converting domain host names requests through wild card hostname entries to TCP ports, relaying through a redundant reverse proxy service bus network, with localization and optimization of network traffic flow and automated bandwidth management to remote client network devices.

In one embodiment, a the system of the present invention is implemented by the MyWorkDrive® software as a service (SAAS) from Wanpath LLC, the commercial implementation of an embodiment of the present invention. MyWorkDrive® relays monitor incoming http request urls for hostnames. Any DNS hostnames found in the local lookup table are rewritten to the localhost 127.0.0.1 and TCP port assigned to each customer: In one example acme.myworkdrive.net incoming http request is converted to 127.0.0.1:20001. The local listening port on the MyWorkDrive® relay represents a secure connection back to the customer server through the service bus listening on a localhost and a static port. All outgoing response headers from the customer's server are routed back through the service bus to the MyWorkDrive® relays listening port and are also rewritten from the relay local host 127.0.0.1 and TCP port back to the original requested DNS host and domain name. The system provides for automated provisioning, tear down, failover and monitoring of all connections, relays and service bus connections.

DETAILED DESCRIPTION OF THE INVENTION

Figure 1:
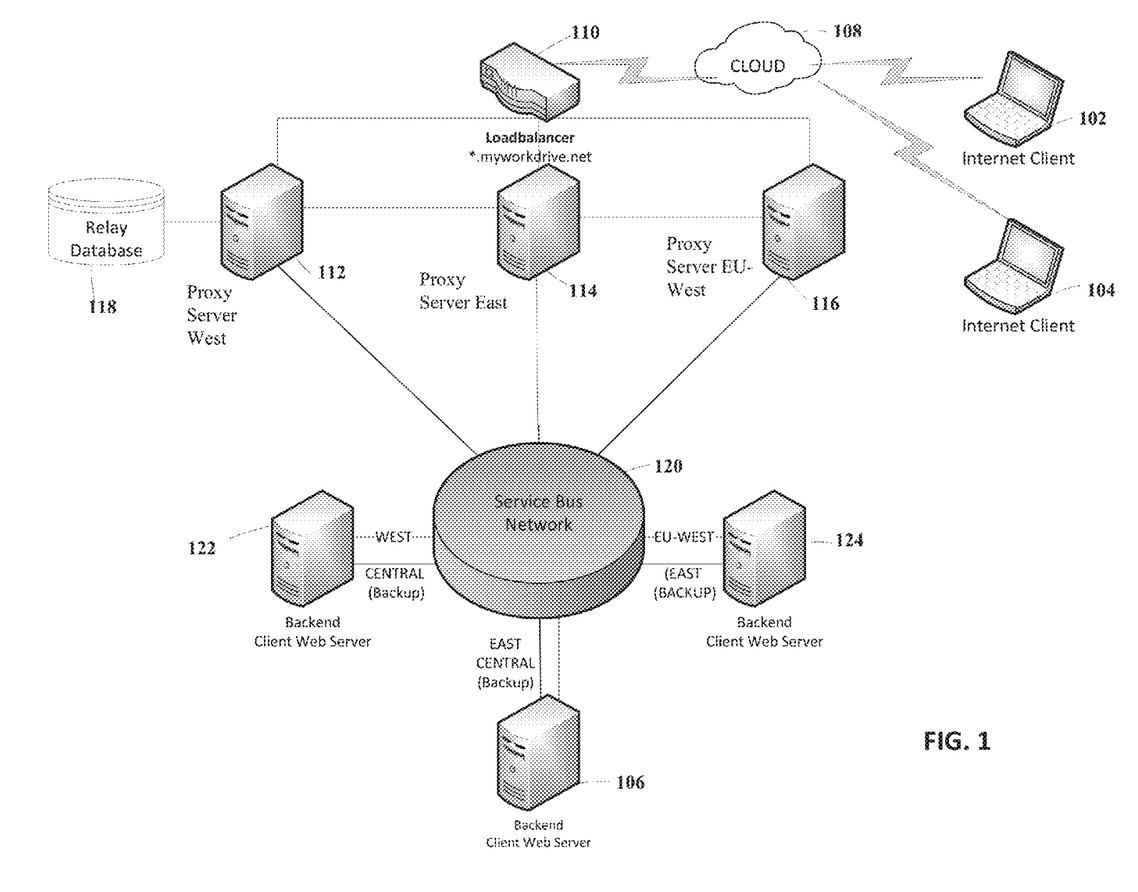
FIG. 1 is a diagram of a reverse proxy relay networking system according to an embodiment.

FIG. 1 is a diagram of a remote access system according to an embodiment of the invention. Internet clients 102 and 104 connect to their private network (106, 122 or 124) through a system of the present invention. Clients 102 and 104 connect, through the Internet 108, to a server 110, which, in one embodiment, has the Internet address "*.myworkdrive.net." Server 110 acts as a load balancer, and connects the clients to one of reverse proxy servers 112 (Cloud connection Proxy West), 114 (Cloud Connection Proxy East) and 116 (Cloud Connection Proxy EU-West).

In one embodiment, server 112 (Cloud connection Proxy West), is identified as follows:
*.myworkdrive.net
Https://clienta.myworkdrive.net
Http://locahost:20001
→sb://clienta.wanpath.net:8357.
Server 114 (Cloud connection Proxy East), is identified as follows:
*.myworkdrive.net
Https://clientb.myworkdrive.net
Http://localhost:20002
→sb://clientb.wanpath.net:8357
Server 116 (Cloud connection Proxy EU-West), is identified as follows:
*.myworkdrive.net
Https://clientc.myworkdrive.net
Http://localhost:20003
→sb://clientc.wanpath.net:8357

Reverse Proxy Servers 112, 114 and 116 each connect to a relay database 118. Alternately, a relay database can be connected locally to each server, with the contents of database 118 replicated. Reverse Proxy Servers connect to a Service Bus network for routing to a client's private network. The client's private network is accessed with backend client webserver 106, which, in one embodiment, has the address "sb://clientb.wanpath.net:8357." The server is a SMB localhost/LAN. The client network, in one embodiment, has multiple, redundant backend clients 122 and 124 for redundancy and backup failover. Server 122 may have the address "sb://clienta.wanpath.net:8357," and server 124 may have the address "sb://clientc.wanpath.net:8357."

Client Network Traffic Flow:

All traffic from a client device, the web interface or the native software desktop tool connects to the public Load balancers 110 over 256-bit SSL encryption using Domain Name System (DNS) requests. The appliances then load balance traffic/requests to the closest MyWorkDrive® reverse proxy server (112, 114, 116) which converts the original request from port 443 (the default port used by secure http) over Secure Socket Layer (SSL) to a custom port assigned to each client's server and hostname. Traffic is then routed through the encrypted service bus service bus on that custom port to the nearest network connection of the clients requested server (106, 122, 124).

MyWorkDrive® Relays monitor incoming http request urls for hostnames. Any DNS hostnames found in the local lookup table are rewritten to the localhost 127.0.0.1 and TCP port assigned to each customer: In one example acme.myworkdrive.net incoming http request is converted to 127.0.0.1:20001. The local listening port on the MyWorkDrive® relay represents a secure connection back to the customer server through the service bus listening on a localhost and a static port. All outgoing response headers from the customer's server are routed back through the service bus to the MyWorkDrive® relays listening port and are also rewritten from the relay local host 127.0.0.1 and TCP port back to the original requested DNS host and domain name.

In one embodiment, the service bus network 120 is a Microsoft Azure® service bus hosted on a server in the cloud, accessible over the Internet. The service bus is a cloud-based messaging system for connecting applications, services, and devices. The service bus relay service enables communication between on-premises applications and the outside world by allowing on-premises web services to project public endpoints. Systems can then access these web services, which continue to run on-premises.

The proxy servers (112, 114, 116) convert communications from the clients (102, 104) on port 843 to an assigned port (static TCP) for the client backend web server (106, 122, 124), using a table stored in relay database 118. The proxy servers also convert the reverse communication from the client backend web servers, again using a table in relay database 118.

The static TCP hosts the converted or original network service port be it HTTP, FTP, WebDAV or other TCP network protocols. Web Distributed Authoring and Versioning (WebDAV) is an extension of the Hypertext Transfer Protocol (HTTP) that allows clients to perform remote Web content authoring operations. The local service converts ports as needed from the original port to a statically assigned unused port for routing through a reverse proxy service bus network—such as SMB (Server Message Block—windows files share ports). Each client server has their own unique server key and service bus identifier to identify and secure proxy traffic and is connected in listen only mode for additional security. No client server may connect to other servers on the service bus as they are in listen only mode and all network traffic is inbound initiated only.

Thus, an agent installed on the client web server operates in listen only mode while communicating with the service bus network, while the agent on the reverse proxy server handles two-way communications with the service bus network. The communication keys for the secure SSL connection are stored with the respective agents.

Redundancy is provided at several levels. If a data center (service bus) is closed, the agent on the client web server will auto-route to another service bus. A client request to the load balancer can be provided to any of the redundant reverse proxy servers. In addition, in one embodiment, each reverse proxy server has at least one redundant reverse proxy server for local load balancing and failover as needed. The load balancer could select between redundant reverse proxy servers using round-robin or other techniques. High bandwidth client communications could be split between different reverse proxy servers in one embodiment.

The use of a wildcard domain name (*.domain.com) allows pointing to the load balancer, and having the load balancer decide which reverse proxy server to use based on the shortest network timeout. Any hostname traffic requests in the wildcard domain name(s) are forwarded to the nearest relay for processing which are bound to a wildcard SSL certificate.

Provisioning Workflows

In one embodiment, software agents are installed on both the client (102, 104) and the client web server (106, 122, 124). The software agents handle the provisioning of the client or the client web server. The provisioning code may be provided on a portable computer readable media, or downloaded over the Internet.

Cloud Connector Proxy Server Deployment Management Workflow

Figure 2:
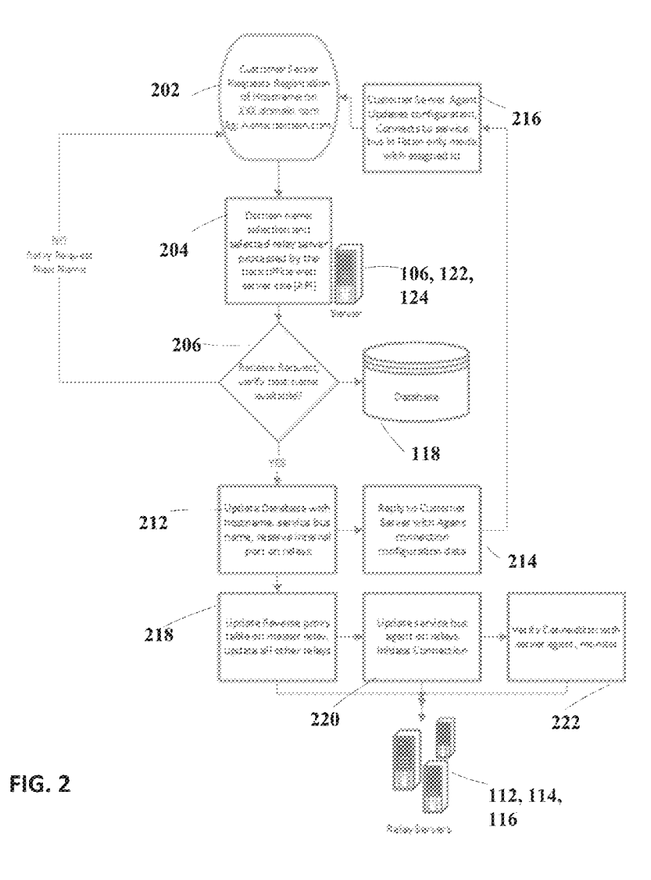
FIG. 2 is a diagram of a cloud connector proxy server deployment management workflow according to an embodiment.

FIG. 2 is a diagram of a cloud connector proxy server deployment management workflow. A customer server first requests registration of a host name (e.g., xxx.domain.com, such as acme.comain.com) in step 202. A relay server is also selected as the default relay server. The domain name selection and selected relay server are processed by the back office web server site (API) of one of servers 106, 122 and 124 (step 204). The domain name request is received by the domain name service (DNS) and the availability of the host name is verified (206). If the host name is not available, a failure message is sent and the customer server retries with a different name (202). If the name is available, it is stored in relay database 108.

The software agent interacts with the client server to mapp internal static ports for and enable service bus communication. A request is made to the service bus server for assignment of a service bus name, Database 108 is updated with the host name, service bus name, and the reserved internal static ports (step 212). The service bus server, in addition to the service bus name, provides connection configuration data to the customer server (214). That data is then used by the customer server agent to update the stored configuration (216) and activate the agent. The customer server agent connects to the service bus server, but in listen mode only, with its assigned ID in listen only mode.

The software agent communicates with the reverse proxy servers (112, 114, 116) to update the proxy table in database 118 (step 218). One of the proxy servers may be designated as a master relay, with the data being written there first, then duplicated on the other servers. A service bus agent on the relays is updated, and a connection is initiated (step 220). The connection with the server agent is verified, and then monitored (step 222).

Cloud Connector Client Communication Workflow

Figure 3:
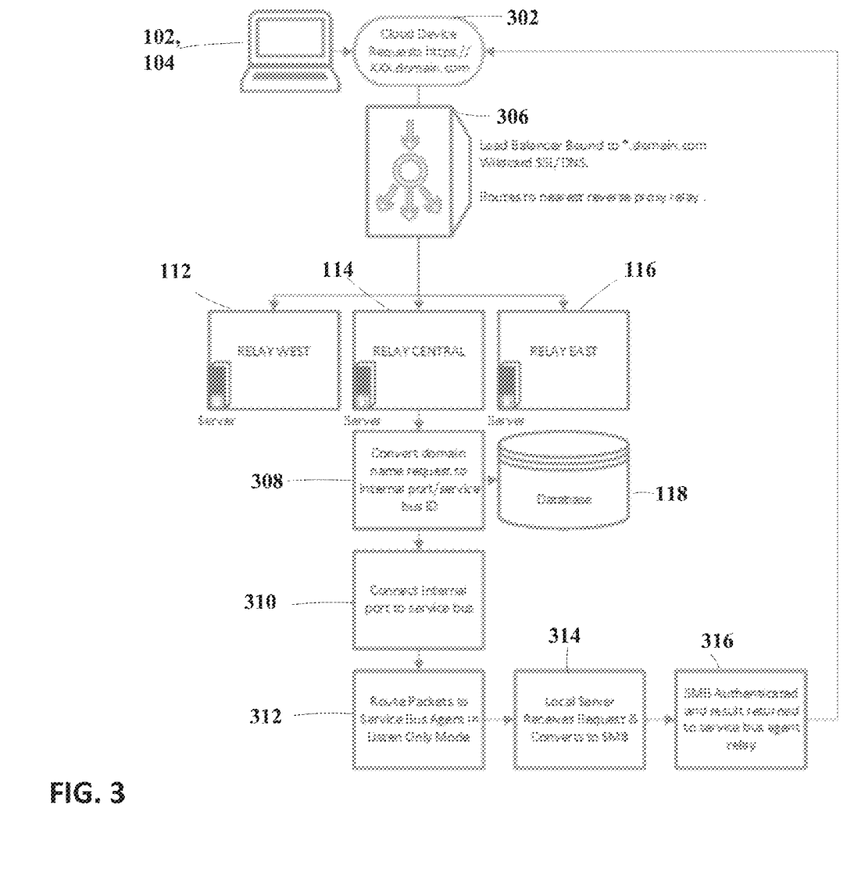
FIG. 3 is a diagram of a cloud connector client communication workflow according to an embodiment.

FIG. 3 is a diagram of a cloud connector client communication workflow. A client device (102, 104) requests a domain name for the client's private network from a DNS server (302). The domain name is provided to the load balancer, which routes the communication to the nearest reverse proxy relay server (step 306). The selected reverse proxy relay server (112, 114, 116) converts the domain name request into an internal port and service bus ID, using a table in database 118 (step 308). A connection is then established with the service bus (310). The communication packets are routed to the service bus agent in listen only mode (312). The Customer's local server (e.g., server 124 in FIG. 1) running MyWorkDrive® Web & WebDAV Server receives the request and converts it to SMB (314). The SMB is then authenticated by the customer's MyWorkDrive® Server and the result is returned to the service bus agent relay (step 316) over http through the secure service bus.

Components

In one embodiment, a reverse proxy relay networking system is provided utilizing redundant relays, Service Bus Networking, and reverse proxy network protocols to provide automated public Domain Name System (DNS) wildcard hostname provisioning, Failover, logging and alerting that exposes on-premise customer servers to the internet over highly secure encrypted channels for client communication without requiring customer DNS changes, local SSL Certificates or exposing network ports to the internet.

In one embodiment, direct Integration with Active Directory, existing shares, users and groups in Windows Web Server:IIS utilizing a custom membership authentication provider to convert SMB network shares or directories to WebDAV over TCP ports that interact with our reverse proxy systems.

SMB (Server Message Block) operates as an application-layer network protocol mainly used for providing shared access to files, printers, and serial ports and miscellaneous communications between nodes on a network. It also provides an authenticated inter-process communication mechanism. Embodiments of the invention can use a variety of programs to convert from SMB network shares or directories to WebDAV, such as Davenport WebDAV-SMB Gateway or Github SambaDAV.

In one embodiment, direct editing and file locking of office documents online is supported without requiring download or re-authentication. This is done using existing Windows IIS user authenticated session id's in the https header over WebDAV protocol utilizing a custom membership authentication provider.

MyWorkDrive® Cloud Connector:

The MyWorkDrive® cloud connector is an agent service installed on the client's server and is used to enable connectivity back to the MyWorkDrive® proxy controllers. The MyWorkDrive® Cloud Connector service allows the client to make the internal TCP ports available to users to the internet utilizing the MyWorkDrive® cloud connector reverse proxy. All customer connections are secured through the Service Bus Relay with encryption with each agent in listen only mode for additional security (thus other clients on the service bus cannot connect to other customers) by design. Each client agent is configured to connect to the nearest network data center with backup connections for redundancy. By design, client's servers connect to the closest MyWorkDrive® relay server which in turn routes their connection over the network service bus in reverse proxy mode to the customer's MyWorkDrive® server listening on a custom or original TCP port. Should any MWD relay be offline, clients connect to the closest next available relay on the network. Our specification includes automated provisioning of relays by customer, TCP port assignment, and duplicate host name verification. All hosts are registered automatically utilizing wild card SSL certificates and domain name system entry tables. The MyWorkDrive® client web server site uses relative paths to facilitate proper http communication through the service bus and reverse proxy.

MyWorkDrive® Relay Servers:

The MyWorkDrive® Relay Server agent provides connectivity for hosting of websites for all MyWorkDrive® Cloud Connector customer sites. Customer sites are automatically provisioned by pulling and publishing routing table database information for each site. MyWorkDrive® relay servers are deployed with a unique TCP port for each customer's server. Each customer site is converted using reverse proxy from port 443 bound to a wild card SSL Certificate and hostname (identified by DNS host name tables) to the unique customer TCP port which in turn is routed through to the service bus over an encrypted channel to the closest customer's network site and MyWorkDrive® Cloud Connector agent. Each client's server MyWorkDrive® Cloud Connector agent is listening on a static local port which responds to the relay servers requests. In addition to routing, reverse proxy and encrypting connections, the relay servers are responsible for managing and monitoring client server agents with rules to automatically recover from errors and publishing or pulling information from a central database.

Monitoring and Recovery Workflow:

Level 1—Monitor customer site: If customer site is down from only 1 relay (temporary, time span <=15 minutes) consider low priority. Continue to monitor every 60 seconds, if connection successes log only.

Level 2—customer site is down from only 1 relay (permanent, time span >15 minutes) consider medium-email alert to our alert mailbox, check site every 15 minutes.

Level 3—customer site is down from all relays (permanent, time span >15 minutes) consider high priority-email alert to our alerts mailbox, email customer, attempt remote restart of MyWorkDrive® cloud connector agent.

Level 4—all customers sites are down from only 1 relay (high priority: 1)—shutdown the web server, send email alert, re-start port bridge agent, check sites every 15 minutes Level 5—relay agent is down (no heartbeat in database) (high priority: 1)—shutdown the web server, send email alert, re-start relay agent, check relay agent every 15 minutes, restart web server on success.

Computer System

Figure 4:
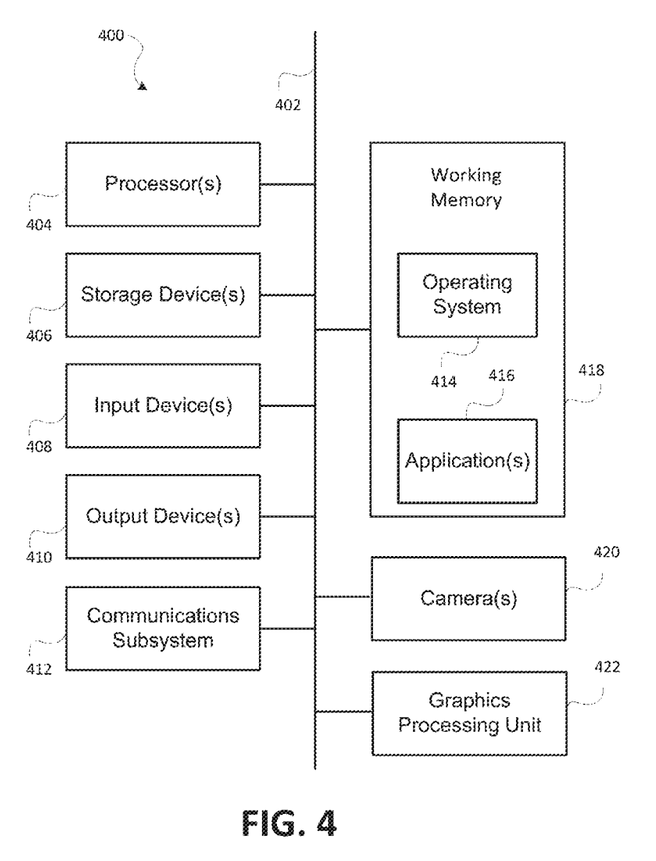
FIG. 4 illustrates an example of a computing system in which one or more embodiments may be implemented.

FIG. 4 illustrates an example of a computing system in which one or more implementations may be implemented.

A computer system as illustrated in FIG. 4 may be incorporated as part of the above described internet clients or servers. For example, computer system 400 can represent some of the components of a display, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 4 provides a schematic illustration of one implementation of a computer system 400 that can perform the methods provided by various other implementations, as described herein, and/or can function as the host computer system, a remote kiosk/terminal, a telephonic or navigation or multimedia interface in an automobile, a computing device, a set-top box, a table computer and/or a computer system. FIG. 4 is meant only to provide a generalized illustration of various components, any or all of which may be utilized as appropriate. FIG. 5, therefore, broadly illustrates how individual system elements may be implemented in a relatively separated or relatively more integrated manner.

The computer system 400 is shown comprising hardware elements that can be electrically coupled via a bus 402 (or may otherwise be in communication, as appropriate). The hardware elements may include one or more processors 404, including without limitation one or more general-purpose processors and/or one or more special-purpose processors (such as digital signal processing chips, graphics processing units 422, and/or the like); one or more input devices 508, which can include without limitation one or more cameras, sensors, a mouse, a keyboard, a microphone configured to detect ultrasound or other sounds, and/or the like; and one or more output devices 410, which can include without limitation a display unit such as the device used in implementations of the invention, a printer and/or the like. Additional cameras 420 may be employed for detection of user's extremities and gestures. In some implementations, input devices 408 may include one or more sensors such as infrared, depth, and/or ultrasound sensors. The graphics processing unit 422 may be used to carry out the method for real-time wiping and replacement of objects described above.

In some implementations of the implementations of the invention, various input devices 408 and output devices 410 may be embedded into interfaces such as display devices, tables, floors, walls, and window screens. Furthermore, input devices 408 and output devices 410 coupled to the processors may form multi-dimensional tracking systems.

The computer system 400 may further include (and/or be in communication with) one or more non-transitory storage devices 506, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 400 might also include a communications subsystem 512, which can include without limitation a modem, a network card (wireless or wired), an infrared communication device, a wireless communication device and/or chipset (such as a Bluetooth device, an 802.11 device, a Wi-Fi device, a WiMax device, cellular communication facilities, etc.), and/or the like. The communications subsystem 412 may permit data to be exchanged with a network, other computer systems, and/or any other devices described herein. In many implementations, the computer system 400 will further comprise a non-transitory working memory 418, which can include a RAM or ROM device, as described above.

The computer system 400 also can comprise software elements, shown as being currently located within the working memory 418, including an operating system 414, device drivers, executable libraries, and/or other code, such as one or more application programs 416, which may comprise computer programs provided by various implementations, and/or may be designed to implement methods, and/or configure systems, provided by other implementations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 406 described above. In some cases, the storage medium might be incorporated within a computer system, such as computer system 500. In other implementations, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which may be executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some implementations, one or more elements of the computer system 500 may be omitted or may be implemented separate from the illustrated system. For example, the processor 504 and/or other elements may be implemented separate from the input device 508. In one implementation, the processor may be configured to receive images from one or more cameras that are separately implemented. In some implementations, elements in addition to those illustrated in FIG. 4 may be included in the computer system 400.

Some implementations may employ a computer system (such as the computer system 400) to perform methods in accordance with the disclosure. For example, some or all of the procedures of the described methods may be performed by the computer system 400 in response to processor 404 executing one or more sequences of one or more instructions (which might be incorporated into the operating system 414 and/or other code, such as an application program 416) contained in the working memory 418. Such instructions may be read into the working memory 418 from another computer-readable medium, such as one or more of the storage device(s) 406. Merely by way of example, execution of the sequences of instructions contained in the working memory 418 might cause the processor(s) 504 to perform one or more procedures of the methods described herein.

The terms "machine-readable medium" and "computer-readable medium," as used herein, refer to any medium that participates in providing data that causes a machine to operate in a specific fashion. In some implementations implemented using the computer system 500, various computer-readable media might be involved in providing instructions/code to processor(s) 504 for execution and/or might be used to store and/or carry such instructions/code (e.g., as signals). In many implementations, a computer-readable medium may be a physical and/or tangible storage medium. Such a medium may take many forms, including but not limited to, non-volatile media, volatile media, and transmission media. Non-volatile media include, for example, optical and/or magnetic disks, such as the storage device(s) 406. Volatile media include, without limitation, dynamic memory, such as the working memory 418. Transmission media include, without limitation, coaxial cables, copper wire and fiber optics, including the wires that comprise the bus 402, as well as the various components of the communications subsystem 412 (and/or the media by which the communications subsystem 412 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 404 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various implementations of the invention.

The communications subsystem 412 (and/or components thereof) generally will receive the signals, and the bus 402 then might carry the signals (and/or the data, instructions, etc. carried by the signals) to the working memory 518, from which the processor(s) 404 retrieves and executes the instructions. The instructions received by the working memory 418 may optionally be stored on a non-transitory storage device 406 either before or after execution by the processor(s) 404.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A method for establishing a secure communication between a remote internet client and a client web server on a remote private network, comprising:
    using a domain service to obtain the address of a reverse proxy server for initiating a communication;
    using the reverse proxy server to transform a standard secure port access request to a static port;
    the reverse proxy server also transforming the address of the reverse proxy server to an address of the client web server;
    routing a transformed message through a service bus network;
    monitoring the service bus network by the client web server in listen-only mode;
    wherein the reverse proxy server does a translation from a default port to a static port assigned by the client web server;
    wherein the reverse proxy server exposes internal network ports through a redundant pathway over Secure Socket Layer (SSL);
    wherein the reverse proxy server converts domain host names requests through wild card hostname entries, provided by the domain name service, to TCP ports;
    wherein the reverse proxy server monitors incoming http request URLs for hostnames and rewrites any DNS hostnames found in a local lookup table to a localhost and TCP port assigned to a source of the request;

wherein a local listening port on the reverse proxy server represents a secure connection back to a customer server through a service bus listening on a localhost and a static port; and wherein outgoing response headers from a customer server are routed back through the service bus to the local listening port and are rewritten from the localhost and TCP port back to an original requested DNS host and domain name.

2. The method of claim 1 wherein the reverse proxy server exposes internal network ports through a redundant pathway over Secure Socket Layer (SSL) without requiring firewall changes, local SSL certificates, local hostnames or Network Translation policies.

3. The method of claim 1 further comprising providing localization and optimization of network traffic flow and automated bandwidth management to remote client network devices.

4. A system for establishing a secure communication between a remote internet client and a client web server on a remote private network, comprising:
   a reverse proxy server;
   a client web server;
   a domain name server configured to provide the address of a reverse proxy server for initiating a communication;
   the reverse proxy server being configured to transform a standard secure port access request to a static port and to transform the address of the reverse proxy server to an address of the client web server;
   a service bus network configured to rout a transformed message; and
   the client web server being configured to monitor the service bus network in listen-only mode;
   wherein the reverse proxy server is further configured to translate from a default port to a static port assigned by the client web server;
   wherein the reverse proxy server is configured to expose internal network ports through a redundant pathway over Secure Socket Layer (SSL);
   wherein the reverse proxy server is configured to convert domain host names requests through wild card hostname entries, provided by the domain name service, to TCP ports;
   wherein the reverse proxy server is configured to monitor incoming http request URLs for hostnames and rewrite any DNS hostnames found in a local lookup table to a localhost and TCP port assigned to a source of the request;
   wherein a local listening port on the reverse proxy server is configured to represent a secure connection back to a customer server through a service bus listening on a localhost and a static port; and
   wherein outgoing response headers from a customer server are routed back through the service bus to the local listening port and are rewritten from the localhost and TCP port back to an original requested DNS host and domain name.

5. The system of claim 4 wherein the reverse proxy server is configured to expose internal network ports through a redundant pathway over Secure Socket Layer (SSL) without requiring firewall changes, local SSL certificates, local hostnames or Network Translation policies.

6. A non-transitory computer-readable medium containing computer readable code with instructions for establishing a secure communication between a remote internet client and a client web server on a remote private network, the instructions comprising code for:
   using a domain name service to obtain the address of a reverse proxy server for initiating a communication;
   using the reverse proxy server to transform a standard secure port access request to a static port;
   using the reverse proxy server to transform the address of the reverse proxy server to an address of the client web server;
   routing a transformed message through a service bus network; and
   monitoring the service bus network by the client web server in listen-only mode;
   wherein the reverse proxy server does a translation from a default port to a static port assigned by the client web server;
   wherein the reverse proxy server exposes internal network ports through a redundant pathway over Secure Socket Layer (SSL);
   wherein the reverse proxy server converts domain host names requests through wild card hostname entries, provided by the domain name service, to TCP ports;
   wherein the reverse proxy server monitors incoming http request URLs for hostnames and rewrites any DNS hostnames found in a local lookup table to a localhost and TCP port assigned to a source of the request;
   wherein a local listening port on the reverse proxy server represents a secure connection back to a customer server through a service bus listening on a localhost and a static port; and
   wherein outgoing response headers from a customer server are routed back through the service bus to the local listening port and are rewritten from the localhost and TCP port back to an original requested DNS host and domain name.

7. The non-transitory computer-readable medium of claim 6 further comprising computer readable code for causing the reverse proxy server to expose internal network ports through a redundant pathway over Secure Socket Layer (SSL) without requiring firewall changes, local SSL certificates, local hostnames or Network Translation policies.

8. The non-transitory computer-readable medium of claim 6 further comprising computer readable code for providing localization and optimization of network traffic flow and automated bandwidth management to remote client network devices.

* * * * *